United States Patent
Kim

(10) Patent No.: US 6,380,995 B1
(45) Date of Patent: Apr. 30, 2002

(54) TRANSFLECTIVE LIQUID CRYSTAL DISPLAY DEVICE WITH ASYMMETRY REFLECTIVE ELECTRODE HAVING A TRANSPARENT PORTION FACING A MAIN VIEWING ANGLE

(75) Inventor: Yong Beom Kim, Kunpo-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/368,414

(22) Filed: Aug. 5, 1999

(30) Foreign Application Priority Data

Aug. 6, 1998  (KR) .............................................. 98-31991

(51) Int. Cl.[7] .............................................. G02F 1/133
(52) U.S. Cl. .......................... 349/113; 349/114; 349/61
(58) Field of Search .................................. 349/113, 114, 349/61, 68; 362/26, 29, 31, 27, 300, 346

(56) References Cited

U.S. PATENT DOCUMENTS 4,040,727 A * 8/1977 Ketchpel .................... 349/113
4,832,459 A * 5/1989 Harper et al. ................ 349/114
5,724,112 A   3/1998 Yoshida et al.
6,285,426 B1 * 9/2001 Akins et al. ................. 349/114

* cited by examiner

*Primary Examiner*—Kenneth Parker
(74) *Attorney, Agent, or Firm*—Long Aldridge & Norman LLP

(57) ABSTRACT

A semitransparent reflective type liquid crystal display device is disclosed which comprises: first and second substrates facing to each other and sandwiching a liquid crystal layer therebeween; a backlight on an outer surface of the first substrate; an uneven layer being on an inner surface of the first substrate and having an uneven surface; a reflecting electrode being along the uneven surface and having a transparent portion substantially facing in a main viewing angle direction which is defined as a direction where the user's eye is mainly positioned. The transparent portion is in the inclined surface facing in the main viewing angle direction. Accordingly, when operating as a reflective type LCD, the quantity of the main external light which is incident on the transparent portion is decreased to improve the light reflectance.

29 Claims, 4 Drawing Sheets

TRANSFLECTIVE LIQUID CRYSTAL DISPLAY DEVICE WITH ASYMMETRY REFLECTIVE ELECTRODE HAVING A TRANSPARENT PORTION FACING A MAIN VIEWING ANGLE

This application claims the benefit of Korean Patent Application No. 1998-31991, filed on Aug. 6, 1998, which is hereby incorporated by reference.

BACKGROUND OF THE INVENTION

1. Field of the Invention

The present invention relates to a liquid crystal display device (LCD), and more particularly, to a semitransparent reflective type LCD which operates both as a transmitting type LCD and a reflective type LCD.

2. Discussion of the Related Art

A liquid crystal display device (LCD) has been widely used for a display device of a portable television and a notebook computer. The liquid crystal display device is classified into two types. One is a transmitting type liquid crystal display device using a backlight as a light source, and the other is a reflective type liquid crystal display device using an external light source such as sunlight and an indoor lamp. It is difficult to decrease the weight, the volume, and the power consumption of the transmitting type LCD because of the backlight. On the other hand, the reflective type LCD has an advantage of not needing to use the backlight, but it cannot operate without the external light source.

In order to overcome the drawback of the two type LCDs, a semitransparent reflective type LCD which can operate both as reflective and transmittance type LCDs is disclosed in the U.S. Pat. No. 5,742,112.

FIG. 1 is a sectional view showing a portion of the semitransparent reflective type LCD, where a thin film transistor (not shown) is the switching element. As shown in FIG. 1, a backlight 3 is provided under a first substrate 1 as a lower substrate, and a first polarizer 2 is provided between the backlight 3 and the first substrate 1 to linearly polarize light from the backlight 3. Further, the first substrate 1 is provided with a semitransparent reflecting electrode which is connected to a drain electrode of a thin film transistor and has opening and recessed portions 13 and 14. A first alignment layer 5 is formed on the semitransparent electrode 4.

A scattering film 12 is formed over a second substrate 9 as an upper substrate to scatter the light, and a second polarizer 11 is formed between the scattering film 12 and the second substrate 9. A phase retardation film 10 is formed between the polarizer 11 and the second substrate 9 to change the polarization direction of the light by optical anisotropy. A transparent electrode 8 as a counter electrode to the reflecting electrode 4 is formed on an inner surface of the second substrate 9, and a second alignment layer 7 is formed thereon. A liquid crystal layer 6 is formed between the two substrates 1 and 9 to control the light polarization by changing the crystal structure of its LC molecules according to the voltage of the reflecting electrode 4.

When there is a bright external light, the semitransparent reflective type LCD operates as a reflective type LCD which uses the external light as a light source without using the backlight 3. The reflected light on the reflecting electrode 4 is scattered in various directions by the scattering film 12 to enlarge the viewing angle range of the user.

When there is no bright external light, the semitransparent reflective type LCD operates as a transmitting type LCD in which light from the backlight 3 enters the liquid crystal layer 6 through the opening and recessed portions 13 and 14.

The semitransparent reflective type LCD has a low power consumption in comparison with the conventional transmitting type LCD because the backlight 3 is not used when there is a bright external light. Further, in comparison with the reflective type LCD, the semitransparent reflective type LCD has an advantage that it can operate as a transparent type LCD using the backlight 3 when there is no bright external light source.

However, when the semitransparent reflective type LCD operates as a reflective type LCD, the incident light is not sufficiently reflected due to the opening and recessed portions 13 and 14, which causes defects due to black spots. Therefore, when used as a reflective type LCD, the semitransparent reflective type LCD has a low reflectance in comparison with the general reflective type LCD.

SUMMARY OF THE INVENTION

Accordingly, the present invention is directed to a semitransparent reflective type liquid crystal display device that substantially obviates the problem due to limitations and disadvantages of the related art.

An object of the present invention is to provide a semitransparent reflective type LCD having an improved light reflectance in the main viewing angle direction.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the object of the present invention, the present invention provides a semitransparent reflective type LCD which comprises first and second substrates facing to each other; a backlight on an outer surface of the first substrate; an uneven layer being on an inner surface of the first substrate and having an uneven surface; a reflecting electrode being along the uneven surface and having a transparent portion substantially facing in a main viewing angle direction which is defined as a direction where the user's eye is mainly positioned; and a liquid crystal layer between the first and second substrates.

A semitransparent reflective LCD of the present invention has the following advantage. The transparent portion is in an inclined surface facing the main viewing angle direction. Accordingly, when operating as a reflective type LCD, the quantity of the main external light which is incident on the transparent portion is decreased to prevent the black spot defect and then increase the light reflectance.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Figure 1:
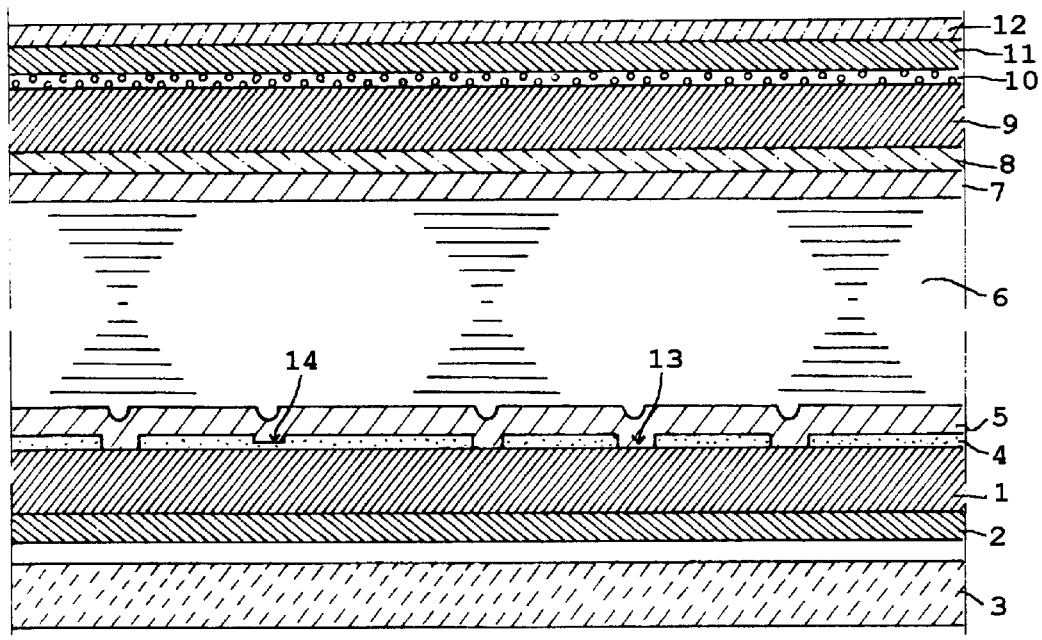
FIG. 1 is a sectional view showing a semitransparent reflective LCD of the related art.

Reference will now be made in detail to the preferred embodiment of the present invention, example of which is illustrated in the accompanying drawings.

Hereinafter, various embodiments of the present invention are described in detail referring to the drawings.

Figure 2:
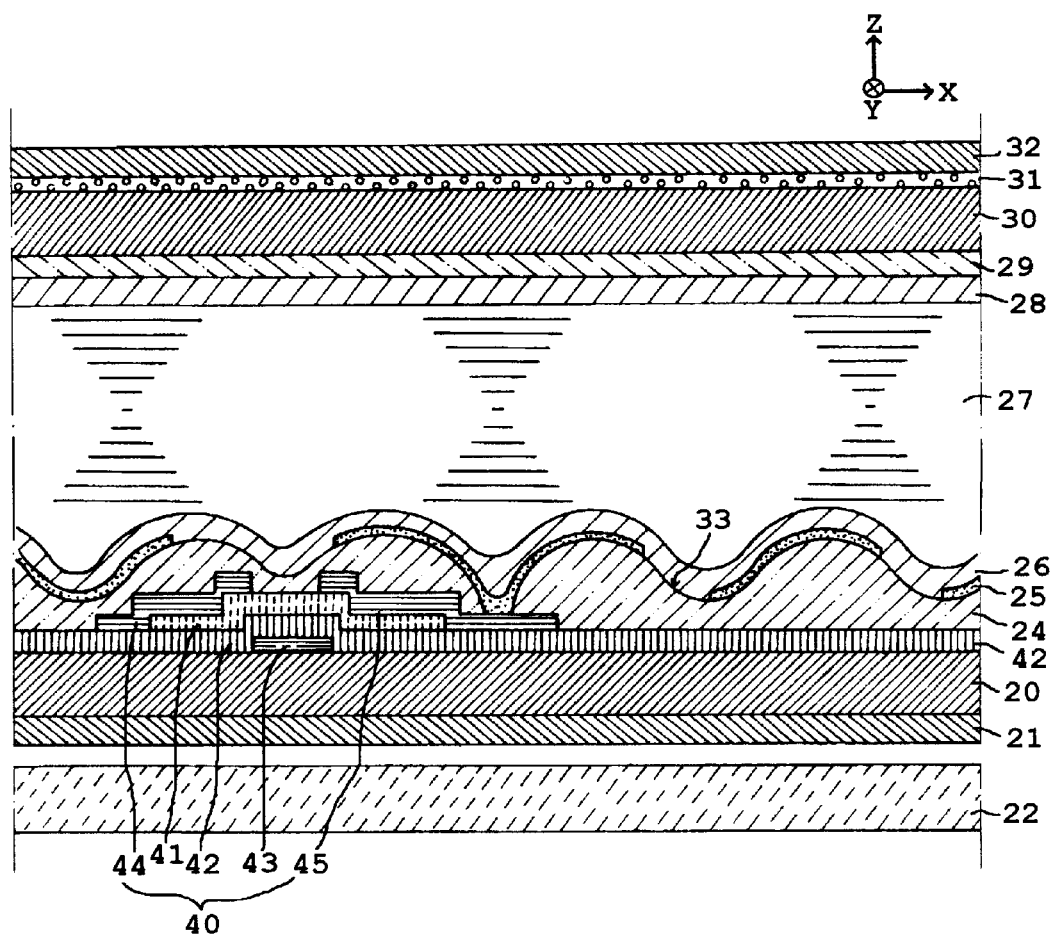
FIG. 2 is a sectional view showing a first embodiment of a semitransparent reflective LCD of the present invention.

As shown in FIG. 2, a semitransparent reflective type LCD of a first embodiment includes a first substrate 20, a second substrate 30, a first polarizer 21 and a backlight 22 on an outer surface of the first substrate 20. A thin film transistor (TFT) 40 is formed on an inner surface of the first substrate 20 and includes a gate electrode 43, gate insulating layer 42, a semiconductor layer 41, a source electrode 44, and a drain electrode 45. An uneven insulating layer 24 is formed over the resultant surface having convex and concave portions. A reflecting electrode 25 is formed thereon to be connected to the drain electrode 45 and has an opened transparent portion 33 in a right inclined surface region facing a main viewing angle direction (which is defined as a direction where the user's eye is mainly positioned). A first alignment layer 26 is formed over the reflecting electrode. A second polarizer 32 is formed over an outer surface of the second substrate 30. A phase retardation film 31 is formed between the polarizer 32 and the second substrate 30. A transparent electrode 29 is formed on an inner surface of the second substrate 30 and functions as a counter electrode to the reflecting electrode 25. A second alignment layer 28 is formed on the transparent electrode 29. A liquid crystal layer 27 is formed between the first and second substrates 20 and 30.

Figure 3:
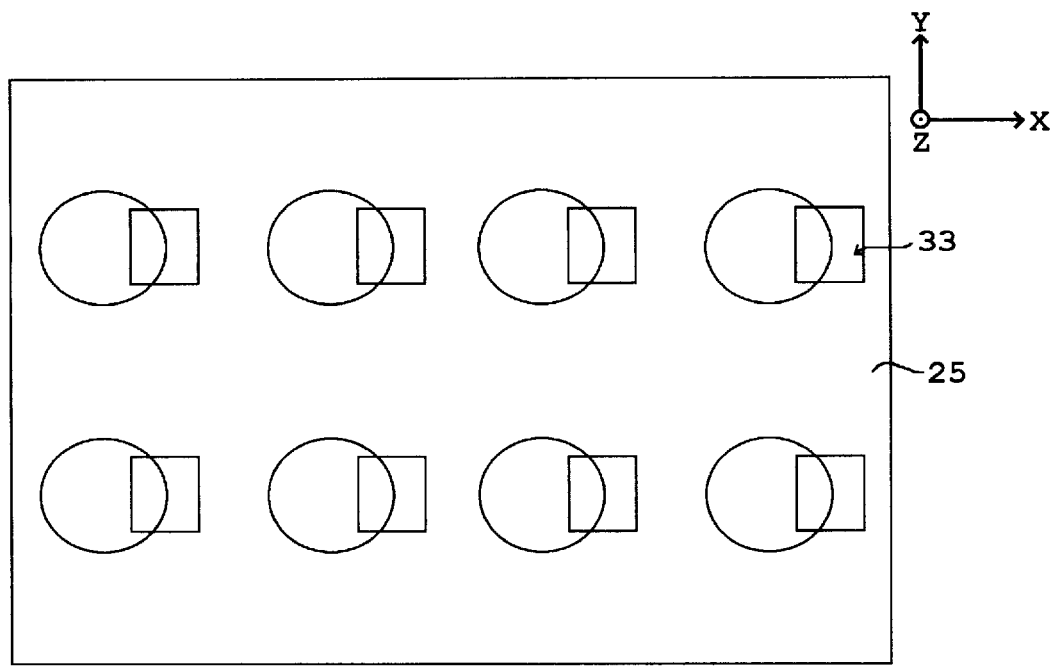
FIG. 3 is plane view showing the first embodiment.
Figure 4:
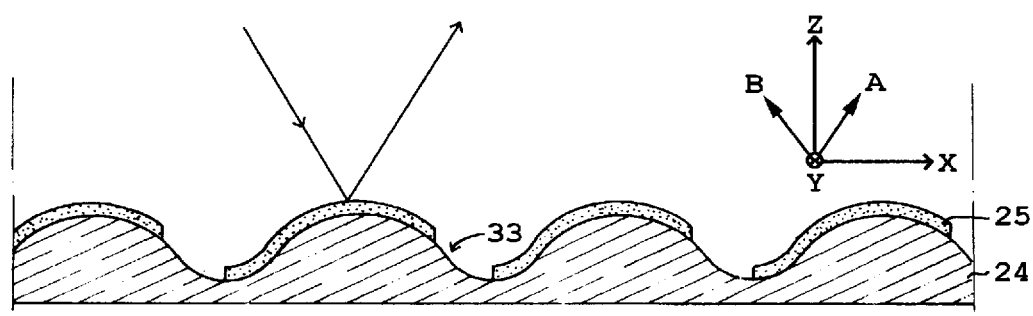
FIG. 4 is a sectional view showing an uneven insulating layer and a reflecting electrode of the firs embodiment.

FIGS. 3 and 4 are plane and sectional views showing the uneven insulating layer 24 and the reflecting electrode 25 in a region where the TFT is not formed. Here, the circled portions indicate the convex portions of the reflecting electrode 25 and the rectangular portions indicate the transparent portions 33.

The uneven surface of the uneven insulating layer 24 has a plurality of convex and concave portions and it is formed by the following process. First, a photosensitive resin layer is coated on the first substrate 20, and then UV light is irradiated into the photosensitive resin layer with a mask, and it is partially developed and heated to form the uneven insulating layer 24. In order that the photosensitive resin layer may be partially developed, positive photosensitive resin having a low resolution is used for the photosensitive resin layer, and the irradiation time, developing time, and curing temperature are preferably controlled so as not to entirely etch the concave portions of the uneven insulating layer 24.

The uneven insulating layer may have other structures so long as it has an uneven surface. For example, another type of uneven insulating layer may be formed by the following process. First, a plurality of bumps are formed on the first substrate 20 by coating, patterning and heating a photosensitive resin layer on the first substrate 20, and then an overcoat layer is coated on the bumps. This overcoat layer will take on the uneven surface having convex and concave portions similar to the uneven insulating layer 24.

The reflecting electrode 25 is formed by depositing a metal such as Al on the uneven insulating layer 24 preferably by a sputtering method, and patterning the deposited metal layer by a photolithography method so that the reflecting layer is formed in each of the pixel regions to be connected to the drain electrode 45. The transparent portions 33 are preferably formed at the right inclined surface regions facing the main viewing angle direction A in a range of +X and +Z directions (i.e. right-up direction as shown in FIG. 4).

The transparent portion can have any plane type such as circle, oval, and polygon. In order to prevent light interference, it is preferable to form the transparent portions so that their sizes and plane outlines are different from each other and intervals between two adjacent transparent portions are the not same. Further, it is possible to form the convex portion of the reflecting electrode 25 to have an oval shape. It is preferable to have the long axis of the oval parallel to the Y axis, which is parallel to the first substrate 20 and perpendicular to the main viewing angle direction A, in order to increase the light reflectance.

In order to prevent the problem caused by not forming the electrode in the transparent portion 33, a transparent electrode of ITO (Indium Tin Oxide) can be formed in regions including the transparent portions 33 before or after forming the reflecting electrode 25. The transparent electrode is connected to the reflecting electrode 25 and functions to apply the pixel voltage at the transparent portion 33.

As shown in FIG. 4, because the main viewing angle direction A is in the "right-up" direction range (+X and +Z direction range), the main external light source which provides a reflected light mostly to the user's eye is in a direction B in a "left-up" direction range (−X and +Z direction range). Because light of the main external light source is incident on the reflecting electrode 25 in the +X and −Z direction, a large quantity of light is incident on the left inclined surface facing the main external light source more than on the right inclined surface facing the user's eye. Accordingly, in the present invention, the transparent portion 33 is formed at the right inclined surface region which faces the user's eye in order to decrease the quantity of light incident on the transparent portion 33 when operating as a reflective type LCD. Further, because the right inclined surface is approximately parallel to the incident direction of the main external light, the incident light on the right inclined surface is mostly reflected to except the main viewing angle direction A. Accordingly, even with the transparent portion 33, the light reflectance in the present invention is not much lower in the main viewing angle direction A, in comparison with the conventional reflective type LCD.

The alignment of the liquid crystal layer 27 is determined by the two alignment layers 26 and 28, and the crystal alignment of its liquid crystal molecules is changed by the electric field applied between the transparent and reflective electrodes 29 and 25, thereby controlling the polarization of light passing through the liquid crystal layer 27.

When operating as a reflective type LCD, voltage is not applied to the backlight 22, and the pixel voltage is applied to the reflecting electrode 25 for changing the crystal alignment of the liquid crystal layer 27. The incident external light is linearly polarized by the second polarizer 32, and then circularly polarized by the light phase retardation film 31. The circularly polarized light is incident on the reflecting electrode 25 after passing through the liquid crystal layer 27, and then the light reflected on the reflecting electrode 25 again passes through the liquid crystal layer 27. While passing through the liquid crystal layer 27, the polarization of the light is changed according to the pixel voltage of the reflecting electrode 25. Thereafter, the polarization of the reflected light is again changed by the light phase retardation film, and finally only the polarization component of the light which is parallel to the polarization axis of the second polarizer 32 passes through the second polarizer 32. Consequently, the light reflectance is controlled by the pixel voltage on the reflecting electrode 25.

When operating as a transmitting type LCD, voltage is applied to the backlight 22, and light from the backlight 22 is linearly polarized by the first polarizer 21. The linearly polarized light is incident on the liquid crystal layer 27 through the transparent portion 33. Thereafter, the light passes through the liquid crystal layer 27, while the polarization of the light is changed according to the pixel voltage of the reflecting electrode 25. Thereafter, the polarization of the reflected light is changed by the light phase retardation film, and finally only the polarization component of the light which is parallel to the polarization axis of the second polarizer 32 passes through the second polarizer 32. Consequently, the light transmittance is controlled by the pixel voltage on the reflecting electrode 25.

Figure 5:
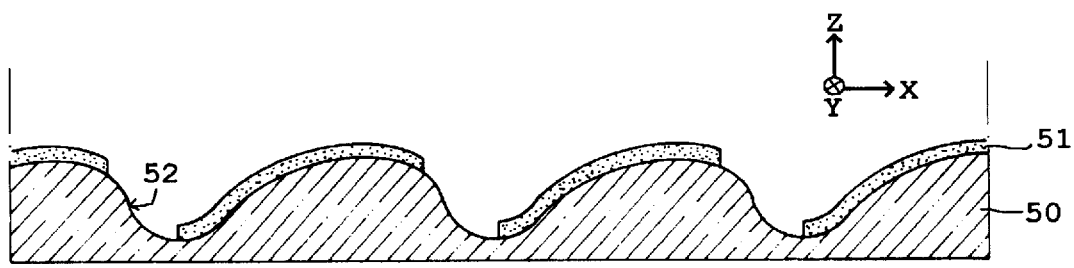
FIG. 5 is a section view showing a second embodiment.

FIG. 5 is a view showing a second embodiment. Here, the main portion of the second embodiment that is different from the first embodiment is shown. As shown in this figure, the right inclined surface of the reflecting electrode 51 is more steeply inclined than the left inclined surface. Thus, when the transparent portion 52 has a same area as the first embodiment, a smaller quantity of the main external light is incident on the transparent portion 52 than the first embodiment.

The semitransparent reflective LCDs of the present invention have the following advantage. The transparent portions 33 and 52 are at the inclined surfaces facing the main viewing angle direction. Accordingly, when operating as a reflective type LCD, the quantity of the main external light which is incident on the transparent portion is decreased to prevent the black spot defect and the light reflectance is increased.

It will be apparent to those skilled in the art that various modification and variations can be made in a semitransparent reflective type liquid crystal display device of the present invention without departing from the spirit or scope of the inventions. Thus, it is intended that the present invention cover the modifications and variations of this invention provided they come within the scope of the appended claims and their equivalents.

What is claimed is:

1. A semitransparent reflective type liquid crystal display device comprising:
    first and second substrates;
    a backlight on an outer surface of the first substrate;
    an uneven layer on an inner surface of the first substrate and having an uneven surface;
    a reflecting electrode along the uneven surface and having a transparent portion substantially facing a main viewing angle; and
    a liquid crystal layer between the first and second substrates.

2. The device according to claim 1, wherein the reflecting electrode in the transparent portion is opened.

3. The device according to claim 1, wherein the reflecting electrode has a first inclined surface portion facing the main viewing angle direction and is more steeply inclined than a second inclined surface portion opposite the first inclined surface portion.

4. The device according to claim 1, wherein the reflecting electrode has a plurality of transparent portions and at least two of the transparent portions have different sizes.

5. The device according to claim 1, wherein the reflecting electrode has a plurality of transparent portions, and a first interval between two adjacent transparent portions and a second interval between another two adjacent transparent portions have different sizes.

6. The device according to claim 5, wherein the different interval sizes helps to prevent light interference.

7. The device according to claim 1, wherein the uneven layer has a convex portion having an oval shape, the oval having a long axis that is parallel to the first substrate and perpendicular to the main viewing angle direction.

8. The device according to claim 1, further comprising a transparent electrode in the transparent portion and connected to the reflecting electrode.

9. The device according to claim 1, further comprising a transparent electrode in the transparent portion.

10. The device according to claim 1, further comprising:
    a first polarizer between the backlight and the first substrate;
    first and second alignment layers on the first and second substrates, respectively;
    a second polarizer on the second substrate;
    a light phase retardation film on the second substrate; and
    a transparent electrode on the second substrate.

11. The device according to claim 10, wherein the transparent electrode acts as a counter electrode to the reflecting electrode.

12. A liquid crystal display device comprising:
    first and second substrates;
    a light source on a first surface of the first substrate;
    an uneven layer on a second surface of the first substrate and having an uneven surface;
    a reflecting electrode along the uneven surface and having a transparent portion substantially facing a main viewing angle; and
    a liquid crystal layer between the first and second substrates.

13. A semitransparent reflective type liquid crystal display device comprising:
    first and second substrates;
    a light source on a first surface of the first substrate;
    a first polarizer between the light source and the first substrate;
    an uneven layer on a second surface of the first substrate and having an uneven surface;
    a reflecting electrode along the uneven surface and having a transparent portion substantially facing a main viewing angle;
    a first alignment layer over the reflecting electrode;
    a second polarizer on a first surface of the second substrate;
    a light phase retardation film adjacent the second polarizer;
    a transparent electrode on a second surface of the second substrate;
    a second alignment layer on the transparent electrode; and
    a liquid crystal layer between the first and second substrates.

14. The device according to claim 12, wherein the reflecting electrode in the transparent portion is opened.

15. The device according to claim 12, wherein the reflecting electrode has a first inclined surface portion facing the main viewing angle direction and is more steeply inclined than a second inclined surface portion opposite the first inclined surface portion.

16. The device according to claim 12, wherein the reflecting electrode has a plurality of transparent portions and at least two of the transparent portions have different sizes.

17. The device according to claim 12, wherein the reflecting electrode has a plurality of transparent portions, and a first interval between two adjacent transparent portions and a second interval between another two adjacent transparent portions have different sizes.

18. The device according to claim 17, wherein the different interval sizes helps to prevent light interference.

19. The device according to claim 12, wherein the uneven layer has a convex portion having an oval shape, the oval having a long axis that is parallel to the first substrate and perpendicular to the main viewing angle direction.

20. The device according to claim 12, further comprising a transparent electrode in the transparent portion and connected to the reflecting electrode.

21. The device according to claim 12, further comprising a transparent electrode in the transparent portion.

22. A semitransparent reflective type liquid crystal display device comprising:
    first and second substrates;
    a backlight on an outer surface of the first substrate;
    an uneven layer on an inner surface of the first substrate and having an uneven surface;
    a reflecting electrode along the uneven surface and having a transparent portion; and
    a liquid crystal layer between the first and second substrates;
    wherein the reflecting electrode has a first inclined surface portion facing the main viewing angle direction and is more steeply inclined than a second inclined surface portion opposite the first inclined surface portion.

23. A semitransparent reflective type liquid crystal display device comprising:
    first and second substrates;
    a backlight on an outer surface of the first substrate;
    an uneven layer on an inner surface of the first substrate and having an uneven surface;
    a reflecting electrode along the uneven surface and having a transparent portion; and
    a liquid crystal layer between the first and second substrates;
    wherein the reflecting electrode has a plurality of transparent portions, and a first interval between two adjacent transparent portions and a second interval between another two adjacent transparent portions have different sizes; and
    wherein the different interval sizes helps to prevent light interference.

24. A semitransparent reflective type liquid crystal display device comprising:
    first and second substrates;
    a backlight on an outer surface of the first substrate;
    an uneven layer on an inner surface of the first substrate and having an uneven surface;
    a reflecting electrode along the uneven surface and having a transparent portion; and
    a liquid crystal layer between the first and second substrates;
    further comprising a transparent electrode in the transparent portion and connected to the reflecting electrode.

25. A semitransparent reflective type liquid crystal display device comprising:
    first and second substrates;
    a backlight on an outer surface of the first substrate;
    an uneven layer on an inner surface of the first substrate and having an uneven surface;
    a reflecting electrode along the uneven surface and having a transparent portion; and
    a liquid crystal layer between the first and second substrates;
    further comprising a transparent electrode in the transparent portion.

26. A liquid crystal display device comprising:
    first and second substrates;
    a light source on a first substrate of the first substrate;
    an uneven layer on a second surface of the first substrate and having an uneven surface;
    a reflecting electrode along the uneven surface and having a transparent portion; and
    a liquid crystal layer between the first and second substrates;
    wherein the reflecting electrode has a first inclined surface portion facing the main viewing angle direction and is more steeply inclined than a second inclined surface portion opposite the first inclined surface portion.

27. A liquid crystal display device comprising:
    first and second substrates;
    a light source on a first substrate of the first substrate;
    an uneven layer on a second surface of the first substrate and having an uneven surface;
    a reflecting electrode along the uneven surface and having a transparent portion; and
    a liquid crystal layer between the first and second substrates;
    wherein the reflecting electrode has a plurality of transparent portions, and a first interval between two adjacent transparent portions and a second interval between another two adjacent transparent portions have different sizes; and
    wherein the different interval sizes helps to prevent light interference.

28. A liquid crystal display device comprising:
    first and second substrates;
    a light source on a first substrate of the first substrate;
    an uneven layer on a second surface of the first substrate and having an uneven surface;
    a reflecting electrode along the uneven surface and having a transparent portion; and
    a liquid crystal layer between the first and second substrates;
    further comprising a transparent electrode in the transparent portion and connected to the reflecting electrode.

29. A liquid crystal display device comprising:
    first and second substrates;
    a light source on a first substrate of the first substrate;
    an uneven layer on a second surface of the first substrate and having an uneven surface;
    a reflecting electrode along the uneven surface and having a transparent portion; and
    a liquid crystal layer between the first and second substrates;
    further comprising a transparent electrode in the transparent portion.

* * * * *